March 13, 1934.   C. HATAY   1,951,149
ELECTRIC APPARATUS
Filed Nov. 18, 1931   3 Sheets-Sheet 1

INVENTOR
Charles Hatay
BY
ATTORNEY

March 13, 1934.　　　C. HATAY　　　1,951,149
ELECTRIC APPARATUS
Filed Nov. 18, 1931　　　3 Sheets-Sheet 2
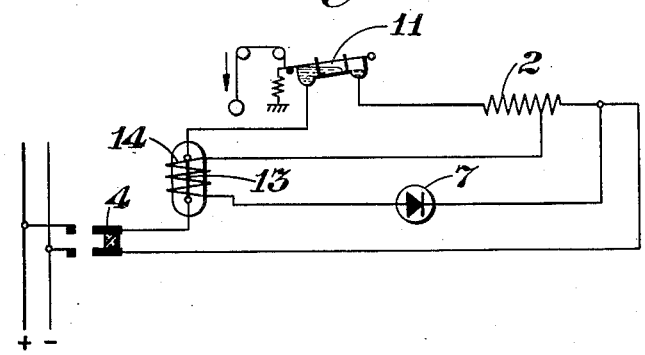
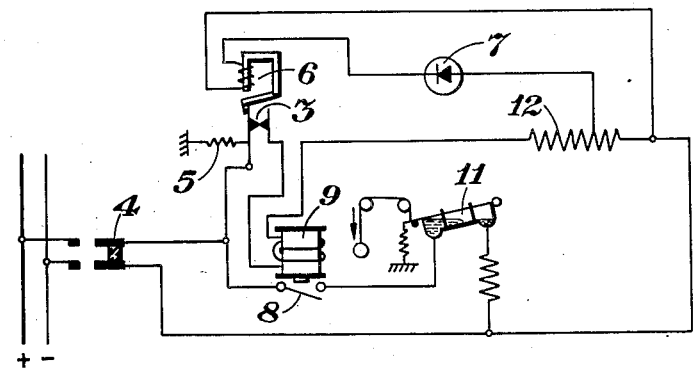
INVENTOR
Charles Hatay
BY
ATTORNEY Patented Mar. 13, 1934

1,951,149

UNITED STATES PATENT OFFICE 1,951,149

ELECTRIC APPARATUS

Charles Hatay, Berlin-Charlottenburg, Germany, assignor to General Electric Company, a corporation of New York Application November 18, 1931, Serial No. 575,870
In Germany January 10, 1931

5 Claims. (Cl. 175—294)

The present invention relates to electric apparatus, and particularly to direct current apparatus which is intended for use only with a given polarity.

A particular object of the invention is to provide means to protect electrical apparatus from operation on reverse polarity. Another object of the invention is to provide means to positively disconnect direct current electrical apparatus whenever the leads thereto are energized with either alternating current or direct current of reverse polarity. Other objects and advantages of the invention will appear from the following detailed specification or from an inspection of the accompanying drawings.

Many types of direct current apparatus are well known to be adapted for operation on only one polarity. In some cases connection of such devices to a source of reverse polarity results in no particular injury within a limited time, while in other cases, such as with certain types of the well known mercury vapor arc lamps, even a momentary connection to such a source may result in complete destruction of the device. In either case some means of positively disconnecting the apparatus upon application of a reverse polarity to the leads thereto is not only desirable, but frequently essential, especially where the devices are portable units which are to be operated from unpolarized outlets, such, for instance, as ultraviolet generators intended for home use. In some cases it is also desirable to protect these devices from operation on alternating current.

I have now discovered that a rectifier, properly and permanently polarized with respect to the device to be protected, in combination with a suitable relay, may be utilized to positively insure disconnection of the apparatus, or to prevent the connection thereof, if desired, upon application of reverse polarity to the leads to said apparatus. This novel combination is also equally effective to prevent operation of the device on alternating current.

Figure 1:
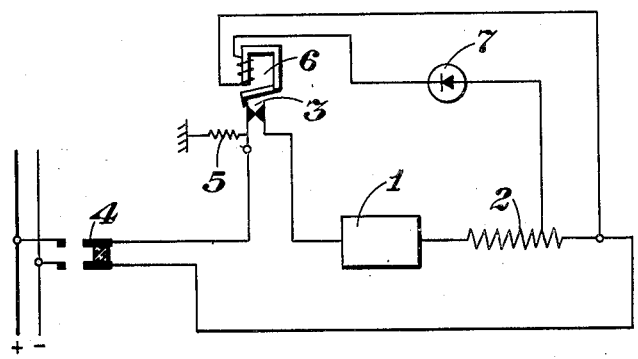
Figure 2:
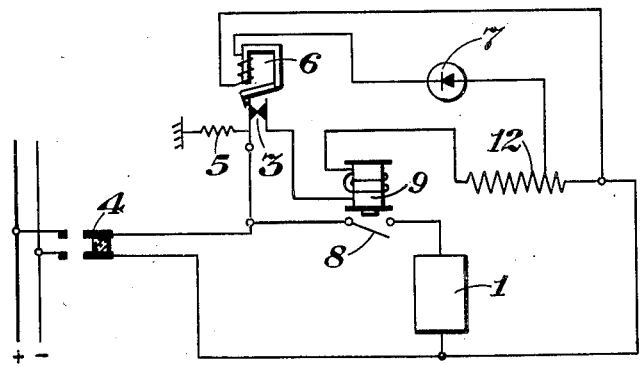
Figure 5:
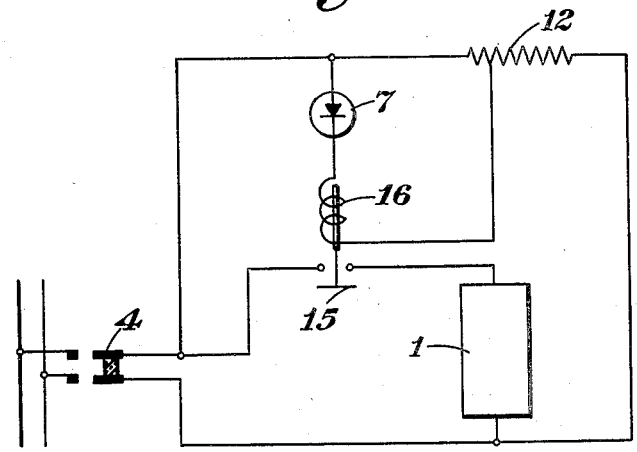
Figure 6:
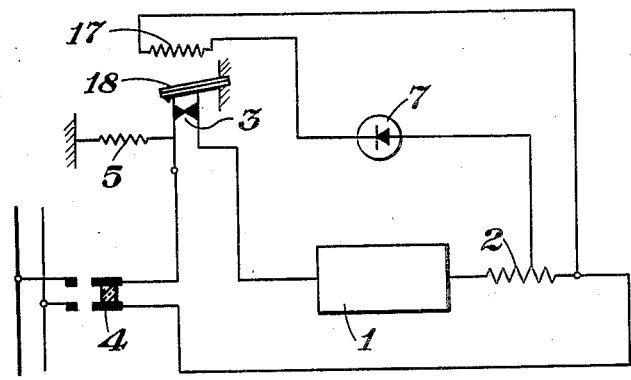

For the purpose of illustrating my invention I have shown several preferred embodiments thereof in the accompanying drawings, in which Fig. 1 is a schematic drawing showing the use of a rectifier and relay to protect a direct current apparatus with which they are associated, Fig. 2 is a schematic drawing showing a modification of the circuit of Fig. 1, Figs. 3 and 4 are schematic drawings showing the application of the circuits of Figs. 1 and 2, respectively, to a mercury vapor arc lamp, Fig. 5 is a schematic drawing of a modification of the circuit of Fig. 2, and Fig. 6 is a schematic drawing of another modification of the circuit of Fig. 1.

Where the device to be protected will withstand operation for a limited time on reverse polarity the relatively simple circuit of Fig. 1 may be used. In the circuit shown in this figure a direct current device 1 of a type which must be operated with a particular polarity, is connected in series with a ballast resistance 2 and a switch 3 between the terminals of a separable plug 4 by which connection may be made to a suitable source of direct current. The contacts of the switch 3 are biased to an open position by the spring 5, but are normally maintained in a closed position by the armature of a relay 6, which acts as a latch therefor. The actuating winding of the relay 6, is connected through a rectifier 7 to a portion of the resistance 2, said resistance thereby serving as a potentiometer to provide a reduced voltage to said relay winding. The rectifier 7, which may conveniently be of the copper-copper oxide type, is connected in such a manner as to prevent current flow through the winding of the relay 6 when the polarity applied to the leads to the apparatus 1 is correct. It is, of course, obvious that the circuit including the rectifier 7 and the winding of the relay 6 may be connected directly across the terminals of the device 1 in any case when no ballast resistance 2 is employed, the rectifier then being so modified as to withstand the higher potential impressed thereon.

Where it is essential that reverse polarity should never be applied, even momentarily, to the apparatus being protected the circuit of Fig. 2 is employed. In this circuit the direct current apparatus 1 is connected, in series with the switch 8, between the terminals of the separable plug 4. The switch 8, which is normally open, forms a part of a retarded relay whose operating coil 9 is connected in series with a switch 3 and a current limiting resistance 12 between the terminals of the separable plug 4. The resistance 12 is tapped and serves as a potentiometer to provide a reduced voltage to the circuit comprising the winding of the relay 6 and the rectifier 7, this rectifier functioning in the same manner as in the circuit of Fig. 1. The closing of the switch 8 is so retarded that the relay 6 has ample time to trip the switch 3 before said switch 8 can be closed by the operating coil 9.

The circuit shown in Fig. 3 is similar to that shown in Fig. 1, a quartz mercury vapor arc lamp 11 of the conventional design, together with tilting mechanism therefor, being illustrated as a concrete example of the apparatus to be protected. In this case the quartz lamp 11 and ballast resistance 2 are connected in series with a switch 13 which is directly operated to an open position by the coil 14, when energized. Said coil 14 is connected in series with the rectifier 7 across a portion of the resistance 2 in the same manner as the operating coil of the relay 6 of Fig. 1.

The circuit of Fig. 4 is substantially identical with that of Fig. 2, save that the quartz mercury vapor arc lamp 11, together with tilting mechanism therefor, is here illustrated as a specific example of the apparatus to be protected.

The circuit of Fig. 5 is a modification of the circuit of Fig. 2. In this circuit the device 1 is connected in series with a switch 15 between the terminals of the separable plug 4. The resistance 12 is likewise connected between the terminals of said plug 4. Said switch 15 is normally open, but can be actuated to a closed position by the coil 16, said coil being connected in series with the rectifier 7 across a portion of the resistance 12. In this case the rectifier is connected so as to pass current whenever the desired polarity is applied to the leads.

In the modification of the circuit of Fig. 1 shown in Fig. 6 the circuit is essentially the same as that shown in Fig. 1. In this modification, however, a bimetallic latching member 18 normally keeps the contacts of the switch 3 closed, while a heater 17 in series with the rectifier 7 serves to move said member 18 to unlatch said contacts when reverse polarity is applied to the device 1. It is, moreover, obvious that any other form of electrical translating means may be used to unlatch, or otherwise operate the contacts of the switch 3, if desired, in place of either the heater-thermostat combination of this circuit, or the relay 6 of the preceding circuits.

In the use and operation of the apparatus of Fig. 1, assuming the plug 4 is connected to the direct current source shown, if the polarity applied to the device 1 is correct the rectifier 7 will prevent the flow of current through the actuating winding of the relay 6, and as a result the switch 3 will remain closed, allowing the device 1 to continue in operation. If, however, reverse polarity is applied to the device 1, the rectifier 7 will pass current to the actuating winding of the relay 6, with the result that the armature thereof will be attracted, unlatching the contacts of the switch 3. Thereupon said switch 3 will be opened by the spring 5, disconnecting the device 1. Similarly, if the plug 4 is inadvertently connected to an alternating current source, the rectifier 7 will pass current to the actuating winding of the relay 6 on alternate half cycles, causing the device 1 to be disconnected. If this is for any reason undesirable, however, the winding of said relay 6 may be made of such impedance as to reduce the pulsating current therethrough to a value insufficient to attract the armature of said relay.

In the modification shown in Fig. 2, assuming the plug 4 is connected to the direct current source shown, current immediately flows through the switch 3, coil 9, and resistance 12. The switch 8 thereupon starts to close. If the polarity applied is correct for operation of the device 1 the rectifier 7 prevents passage of current to the actuating coil of the relay 6, with the result that the switch 3 remains closed. Upon closing of the retarded switch 8 the device 1 is switched in and may be operated as desired. If, however, reverse polarity is applied to the leads the rectifier 7 passes current to the actuating coil of the relay 6, tripping the switch 3 to an open position. The coil 9 is thereupon deenergized before the switch 8 has had time to close, with the result that the device 1 is not connected to the source of incorrect polarity.

The operation of the circuit of Fig. 3 is quite similar to that of Fig. 1. Upon starting the mercury vapor arc 11 by tilting it in a conventional manner current flows therethrough and through the resistance 2. If the polarity is correct the rectifier 7 prevents current flow through the coil 13, and the switch 14 remains closed. If, however, the polarity is incorrect the rectifier 7 permits the passage of current through said coil 13, whereupon the switch 14 is opened and the mercury vapor arc lamp 11 is disconnected.

The operation of the circuit of Fig. 4 is so obviously identical with that of the circuit of Fig. 2 that it need not be further described. Provided that the polarity is correct the switch 8 will be closed after the testing period and the mercury vapor arc lamp 11 can then be operated in a conventional manner.

In the operation of the apparatus shown in Fig. 5, upon application of the correct polarity to the leads to the device 1 current will flow through the rectifier 7 and coil 16, whereupon the switch 15 will be closed and the apparatus 1 connected to the direct current source. If reverse polarity is applied to said leads it is obvious that the rectifier 7 will oppose current flow with the result that the switch 15 will not be closed. If it is desired to prevent the closing of the switch 15 on alternating current it is necessary only to make the coil 16 of such impedance that the pulsating current therethrough will be insufficient to close said switch.

The operation of the apparatus of Fig. 6 is very similar to that of Fig. 1. Upon application of the desired polarity to the device 1 the rectifier 7 opposes current passage through the heater 17, but if reverse polarity is applied to said device the rectifier 7 permits current to flow through said heater 17, whereupon the thermostatic member 18 is rapidly warped until it unlatches the contacts of the switch 3, whereupon the circuit through the device 1 is interrupted.

While I have described my invention by reference to specific structures it is to be understood that it is not limited thereto, but that various omissions, substitutions and changes may be made without departing from the spirit of my invention.

What I claim as new and desire to secure by Letters Patent of the United States is:—

1. In combination, a direct current device adapted to be operated with only one polarity, leads to said device, a delayed closing switch in series with said device, means to close said switch comprising a magnetic coil connected in series with another switch between said leads, means to open said last mentioned switch comprising a magnet connected to said leads, and a rectifier in series with said magnet, said rectifier permitting current passage through said magnet only when reverse polarity is applied to said leads.

2. In combination, a direct current device adapted to be operated with only one polarity, leads to said device, a switch in one of said leads, means to bias said switch to an open position, means responsive to the potential applied to said leads to close said switch, and means including a rectifier to render said switch closing means inoperative before closure of said switch when the potential of said leads is the reverse of that desired.

3. In combination, a direct current device adapted to be operated with only one polarity, leads to said device, a switch in one of said leads, means to bias said switch to the open position, and means to close said switch whenever the correct polarity is applied to said leads comprising an electrical translating device connected in series with a rectifier across said leads between said switch and the source of energy.

4. In combination, a direct current device adapted to be operated with only one polarity, leads to said device, a switch in one of said leads, means to bias said switch to the open position, and means responsive to the potential applied to said leads to close said switch, said means comprising a magnet connected in series with a rectifier across said leads between said switch and the source of energy, whereby said switch is automatically closed upon application of a potential of the desired polarity to said leads.

5. In combination, a direct current device adapted to be operated with only one polarity, leads to said device, a delayed closing switch in series with said device, means responsive to the potential applied to said leads to close said switch, and means including a rectifier to render said switch closing means inoperative when the potential of said leads is the reverse of that desired.

CHARLES HATAY.